United States Patent
Pickering et al.

(10) Patent No.: US 7,773,455 B2
(45) Date of Patent: Aug. 10, 2010

(54) TIME-LAPSE SEISMIC ACQUISITION

(75) Inventors: Stephen Charles Pickering, Hampton (GB); Jonathan (Boff) Anthony Anderson, East Grinstead (GB); Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 620 days.

(21) Appl. No.: 11/687,265

(22) Filed: Mar. 16, 2007

(65) Prior Publication Data

US 2008/0144436 A1 Jun. 19, 2008

Related U.S. Application Data

(60) Provisional application No. 60/869,849, filed on Dec. 13, 2006.

(51) Int. Cl.
*G01V 1/00* (2006.01)
(52) U.S. Cl. ........................................ 367/38
(58) Field of Classification Search ............ 367/20, 367/24, 38; 702/14
See application file for complete search history.

(56) References Cited

U.S. PATENT DOCUMENTS

| | | | |
|---|---|---|---|
| 3,793,620 A * | 2/1974 | Miller | 367/56 |
| 4,837,752 A | 6/1989 | Pepchinski | |
| 4,969,130 A | 11/1990 | Wason et al. | |
| 6,026,058 A | 2/2000 | Thomas | |
| 6,330,512 B1 | 12/2001 | Thomas et al. | |
| 6,438,069 B1 * | 8/2002 | Ross et al. | 367/73 |

FOREIGN PATENT DOCUMENTS

| | | |
|---|---|---|
| WO | 199967660 A1 | 12/1999 |
| WO | 2005114258 A1 | 12/2005 |

OTHER PUBLICATIONS

Eastwood et al. "Time-Lapse-Seismic Processing and Analysis", JPT, Jun. 1999.*
Anderson, Smart and Shabrawi, "Solving an imaging problem in Kuwait Oil Company's Minagish field using single-sensor acquisition and processing," *SEG Technical Program Expanded Abstracts*, pp. 502-505, 2005.

(Continued)

*Primary Examiner*—Jack Keith
*Assistant Examiner*—Krystine Breier

(57) ABSTRACT

Methods for generating a time lapse difference image. In one implementation, the method includes estimating a trace in a first seismic survey data set at each trace coordinate of a second seismic survey data set, estimating a trace in the second seismic survey data set at each trace coordinate of the first seismic survey data set and calculating trace differences between the first seismic survey data set and the second seismic survey data set at each trace coordinate of the first seismic survey data set and the second seismic survey data set.

17 Claims, 9 Drawing Sheets

OTHER PUBLICATIONS

Özbek, Hoteit and Dumitru, "3-D filter design on a hexagonal grid for point-receiver land acquisition," *EAGE 66th Conference & Exhibition*—Paris, France, pp. 1-4, Jun. 7-10, 2004.

Quigley, "An integrated 3D acquisition and processing technique using point sources and point receivers," *SEG Technical Program Expanded Abstracts*, pp. 17-20, 2004.

URL:http://www.westerngeco.com/content/services/q_technology/q_land/vivid.asp.

Vermeer, "3-D symmetric sampling," *SEQ Technical Program Expanded Abstracts*, pp. 906-909, 1994.

Eiken, et al., A Proven Method for Acquiring Highly Repeatable Towed Streamer Seismic Data, Geophysics, Jul.-Aug. 2003, pp. 1303-1309, vol. 68, No. 4.

Hodges, et al., Seismic Repeatability Analysis from Oseberg 4D Processing- a case history, EAGE 66th Conference and Exhibition, Jun. 2004.

Ross, et al., Time-Lapse Seismic Monitoring: Some Shortcomings in Nonuniform Processing, The Leading Edge, Jun. 1997, pp. 1021-1027.

PCT Search Report, dated Dec. 11, 2009, Application No. PCT/US2007/086212.

\* cited by examiner

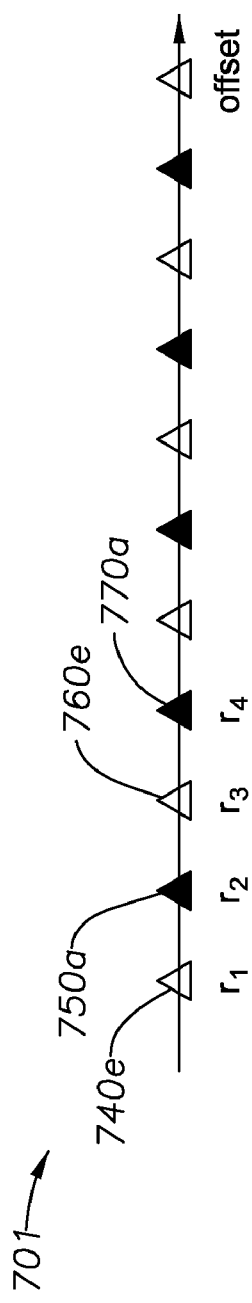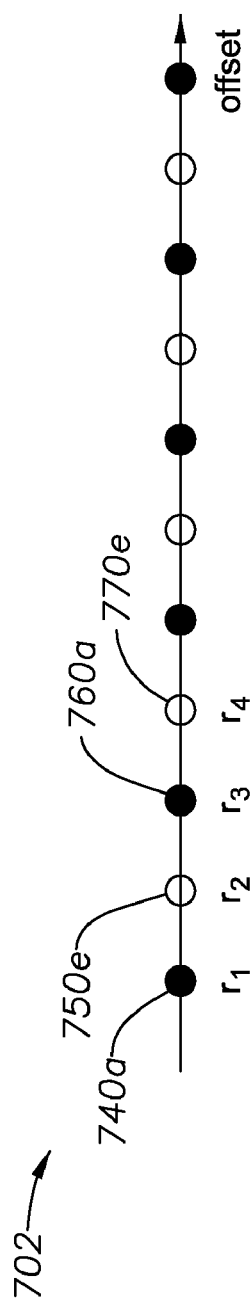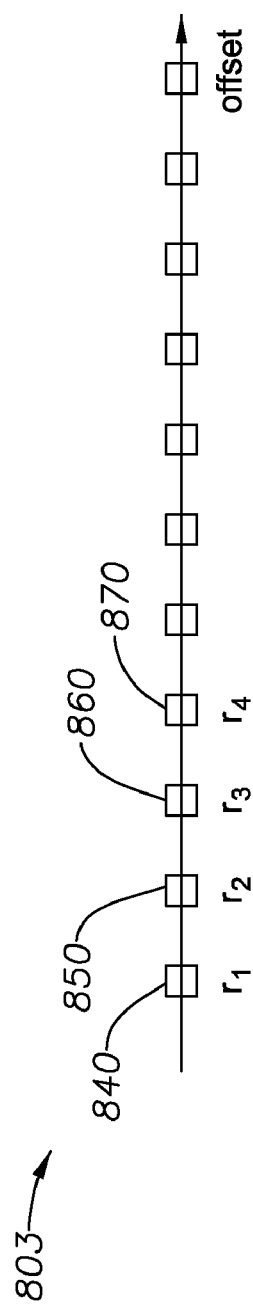

TIME-LAPSE SEISMIC ACQUISITION

The current non-provisional patent application claims the priority of copending provisional patent application, Ser. No. 60/869,849 filed on Dec. 13, 2006 by the same inventors, with the same title.

BACKGROUND

1. Field of the Invention

Implementations of various technologies described herein generally relate to seismic data acquisition, particularly time-lapse seismic data acquisition.

2. Description of the Related Art

The following descriptions and examples are not admitted to be prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wavefield may be sampled by a plurality of seismic sensors, such as geophones, hydrophones and the like. Each sensor may be configured to acquire seismic data, normally in the form of a record or trace representing the value of some characteristic of the seismic wavefield against time. The acquired seismic data may be transmitted over electrical or optical cables to a recorder system. The recorder system may then store, analyze, and/or transmit the data. This data may be used to detect the possible presence of hydrocarbons, changes in the subsurface, and the like.

In a typical time-lapse seismic survey, a second or monitor survey may be performed in the same location as a previous baseline survey for the purpose of comparing the images produced by the two surveys. Typically, the sources may be activated at the same locations and the sensors may be located at the same locations in both surveys. The images may be subtracted to create the time-lapse difference image. A time-lapse difference image represents any change to the subsurface layers since the baseline survey was performed. For example, the difference image may reveal the places in which the oil-and-water contact has moved indicating the areas from which oil has been pumped. If the oil-and-water contact is not changing in all expected areas of the reservoir, another well may be installed to tap into that area.

To maximize the usefulness of each seismic survey performed and minimize overall site cost, it may be desirable that every seismic survey yield new seismic data to capture further aspects of the area's subsurface. Yet, typical time-lapse surveys strive to repeat a baseline survey's source and sensor placement as closely as possible in order to compute a difference image. Thus, a new method of seismic acquisition and processing to both capture new seismic data and compute a seismic difference image may be desirable.

SUMMARY

Described herein are implementations of various technologies for a method for generating a time lapse difference image. In one implementation, the method includes estimating a trace in a first seismic survey data set at each trace coordinate of a second seismic survey data set, estimating a trace in the second seismic survey data set at each trace coordinate of the first seismic survey data set and calculating trace differences between the first seismic survey data set and the second seismic survey data set at each trace coordinate of the first seismic survey data set and the second seismic survey data set.

Described herein are also implementations of various technologies for a method for acquiring seismic data. In one implementation, the method includes acquiring a first set of seismic data using a plurality of first source arrays and a plurality of first sensor arrays and acquiring a second set of seismic data using a plurality of second source arrays and a plurality of second sensor arrays. The second source arrays are positioned at a first predetermined distance from the first source arrays and the second sensor arrays are positioned at a second predetermined distance from the first sensor arrays. The method further includes combining the first set of seismic data with the second set of seismic data.

Described herein are also implementations of various technologies for a computer system, which may include a processor and a memory comprising program instructions executable by the processor to: estimate a trace in a first seismic survey data set at each trace coordinate of a second seismic survey data set, estimate a trace in the second seismic survey data set at each trace coordinate of the first seismic survey data set and calculate trace differences between the first seismic survey data set and the second seismic survey data set at each trace coordinate of the first seismic survey data set and the second seismic survey data set.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 7A-B illustrate baseline and monitor survey CMP gathers with acquired and estimated traces calculated in accordance with implementations of various technologies described herein.

FIG. 8 illustrates a difference CMP gather calculated in accordance with implementations of various technologies described herein.

DETAILED DESCRIPTION

Figure 1:
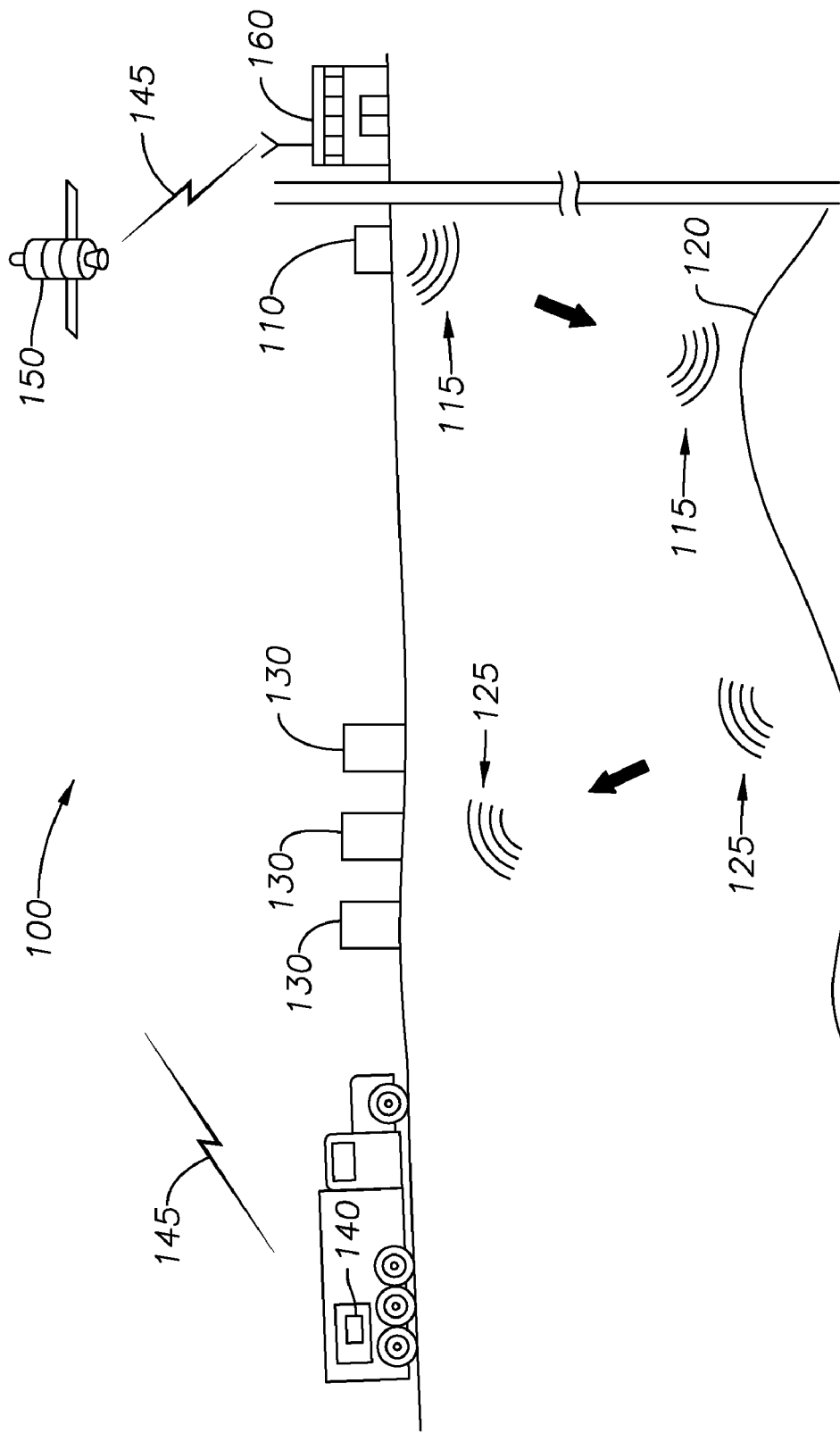
FIG. 1 illustrates a seismic acquisition system in connection with implementations of various technologies described herein.
Figure 2A:
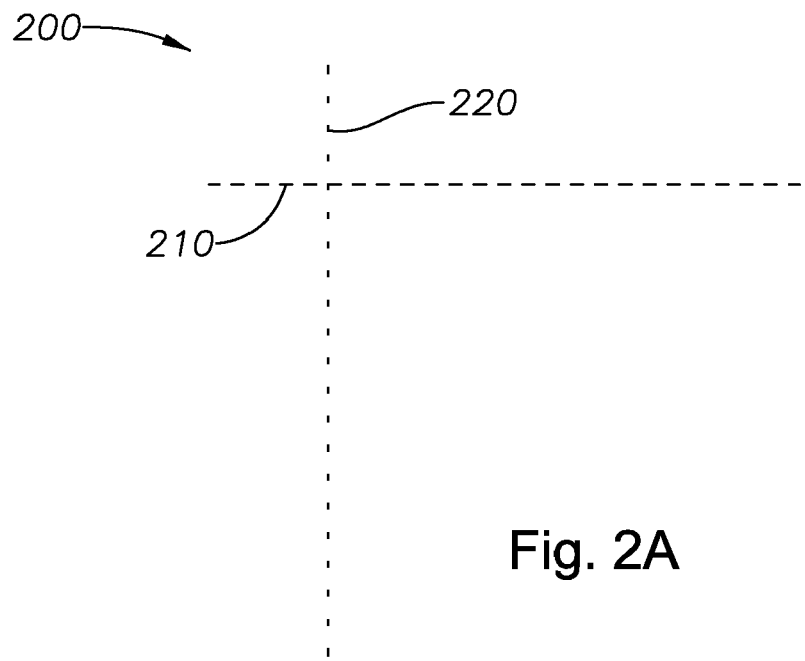
FIG. 2A-B illustrate cross spread source and sensor acquisition arrangements in connection with implementations of various technologies described herein.
Figure 2B:
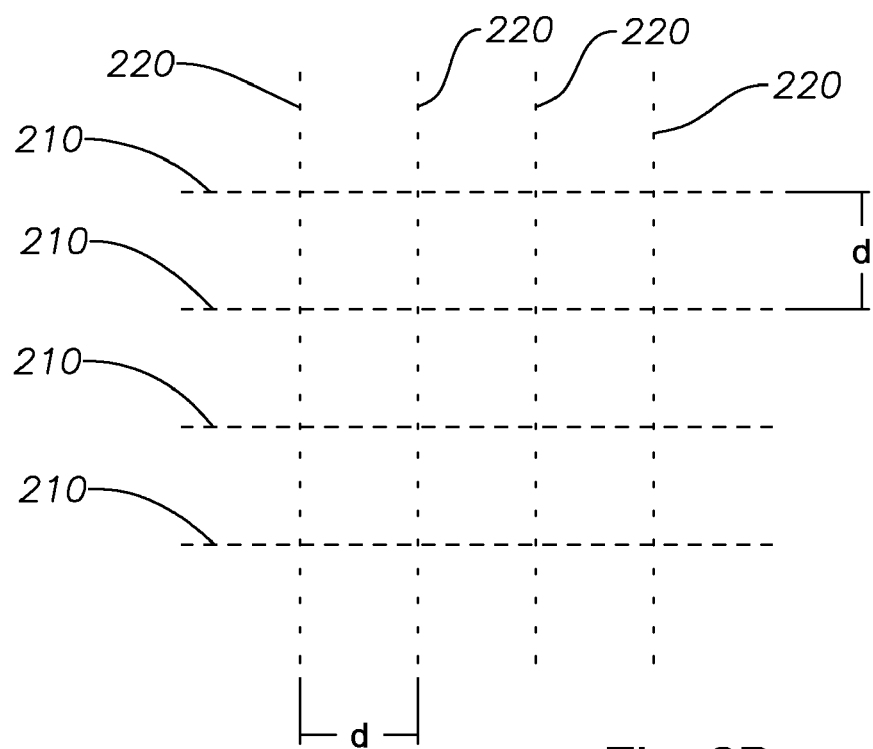

FIG. 1 illustrates a seismic acquisition system 100 in accordance with implementations of various technologies described herein. In one implementation, the seismic acquisition system 100 may include one or more seismic sources 110, a plurality of seismic sensors 130, one or more data collection units 140 and a fixed-base facility 160. In operation, a source 110 may generate a plurality of seismic signals 115 into the earth. The seismic signals 115 may be reflected by subterranean geological formations 120 and return to the sensors 130. The sensors 130 may then acquire and record the seismic signals 125. The sensors 130 may then transmit the recorded seismic data via wired or wireless links to a data collection unit 140. The data collection unit 140, which may include one or more single recorder systems, may be configured to store, process and/or transmit the seismic data. The data from the data collection unit 140 may be transmitted to the fixed-base facility 160 via a satellite 150 and satellite links 145.

Figure 3A:
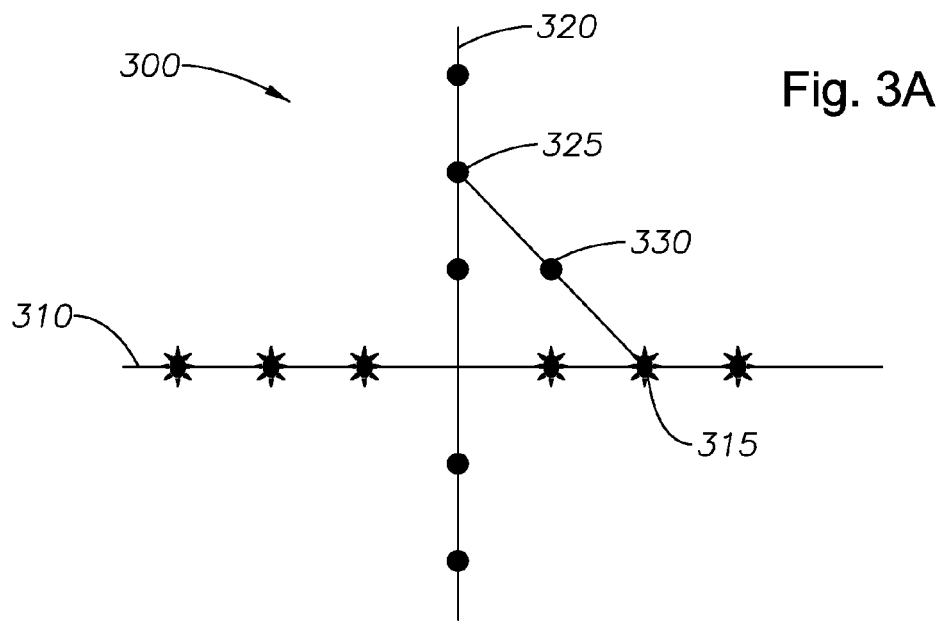
FIGS. 3A-B illustrate a definition of a common mid-point in accordance with implementations of various technologies described herein.
Figure 3B:
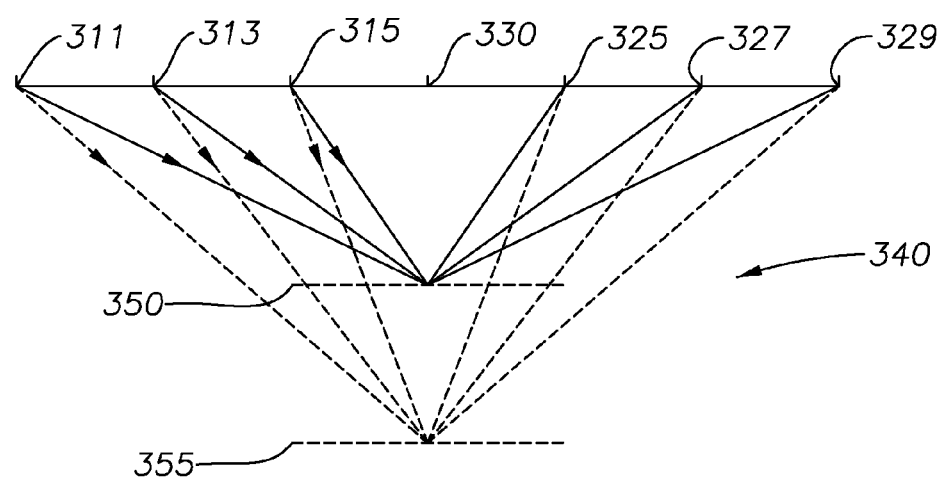

A cross spread source and sensor arrangement may improve the quality of the seismic data because, during data processing, traces with common mid-points (CMP) may be stacked to enhance the seismic signals. As illustrated with a single cross spread 300 in FIG. 3A, the CMP 330 is the point on the earth's surface that is equidistant from a source 315 and sensor 325. The source 315 may be in a linear source array 310 and the sensor 325 may be in a linear sensor array 320. A CMP 330 may be shared by numerous source-sensor pairs when multiple cross spreads are overlapped as illustrated in FIG. 3B. First, second and third seismic sources 311, 313, and 315 may correspond with first, second, and third sensors 325, 327 and 329. The sources and sensors may be arranged about a mid point 330. For the sake of simplicity, the stratum or rock 340 beneath the sources and sensors may be assumed to be isotropic and to contain first and second horizontal partial reflectors 350 and 355. Seismic energy produced from the actuation of the first source 315 may be reflected from the partial reflectors 350 and 355 and received by each of the sensors 325, 327, and 329. However, only the seismic energy paths involving a reflection that occurs directly beneath the mid point 330 have a CMP 330. For example, only energy received at the first receiver 325 as a result of actuation of the first source 315 will have undergone a reflection beneath the mid-point 330, as will energy received at the second receiver 327 as a result of actuation of the second seismic source 313 and energy received at the third receiver 329 as a result of actuation of the third seismic source 311. The point 330 is a CMP for these energy paths as depicted in FIG. 3B. Other seismic energy paths (not shown in FIG. 3B), such as the path between first source 315 and second receiver 327, may not have the point 330 as their mid-point. In a typical seismic surveying arrangement, there may be a large number of possible seismic energy paths and these paths may have a plurality of associated CMPs.

After the raw seismic data have been acquired, the reflected traces received by each of the sensors as a result of the actuation of a source of seismic energy may be processed to produce an image of the earth's interior. During processing of the seismic data obtained in a typical seismic survey, the traces may be initially sorted so that traces having the same CMP are grouped together. A group of traces sharing a CMP is known as a CMP gather. This may enable the geology beneath the line of sources and sensors to be probed at a number of positions. The number of traces recorded for a CMP may be referred to as the fold of the data. Higher fold may enhance the quality of seismic data when the data are stacked.

Figure 4:
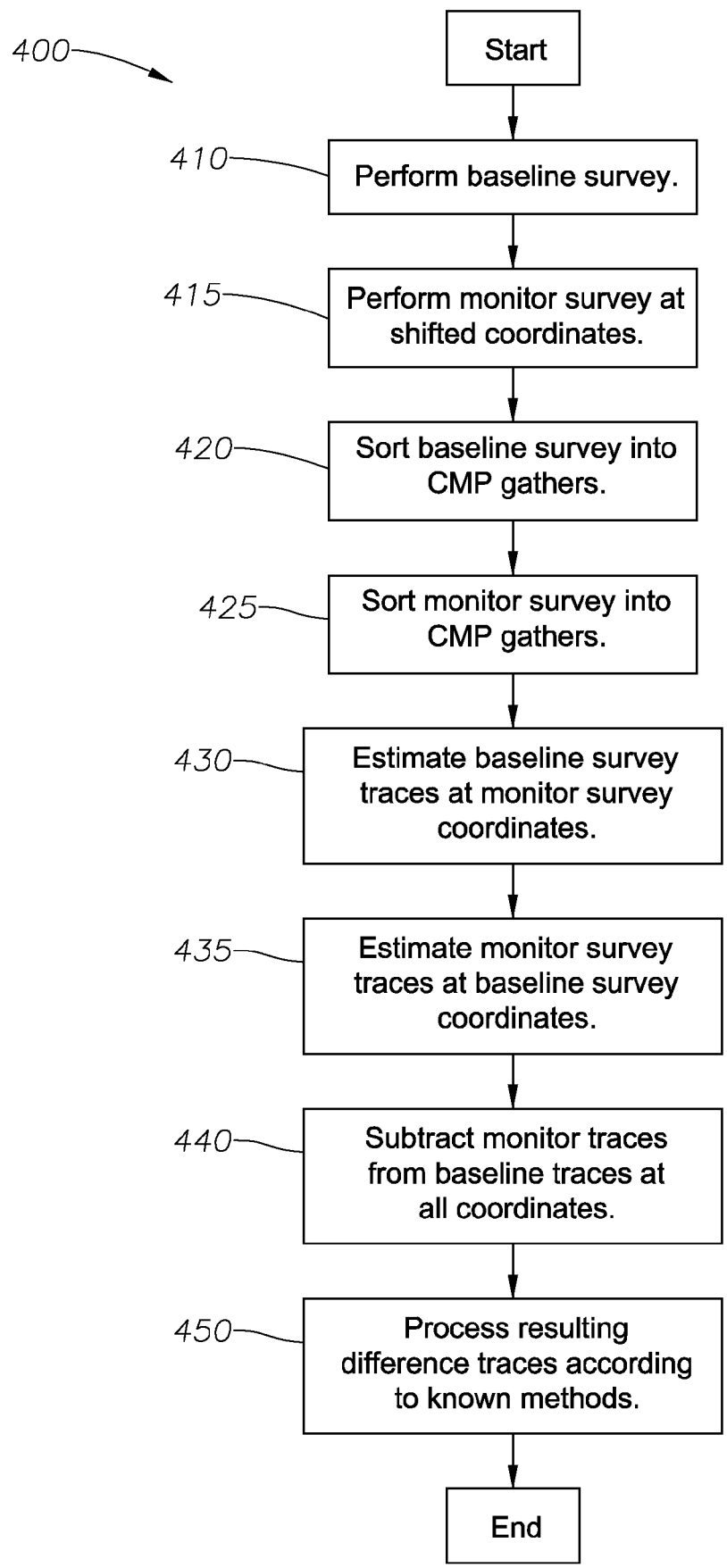
FIG. 4 illustrates a flow diagram of a method for simultaneously acquiring a time-lapse survey difference image and increasing the trace fold in accordance with implementations of various technologies described herein.

As mentioned above, in typical time lapse surveys, monitor surveys may be performed with source and sensor positions as close to the baseline survey positions as possible. However using implementations of the various technologies described herein, a monitor survey may be performed that is shifted from the baseline survey. A difference image may be produced while the trace fold may be increased by a factor of two. FIG. 4 illustrates a flow diagram 400 of a method for simultaneously acquiring a time-lapse survey difference image and increasing the trace fold in accordance with implementations of various technologies described herein. It should be understood that while the operational flow diagram 400 indicates a particular order of execution of the operations, in some implementations, the operations might be executed in a different order.

Figure 5A:
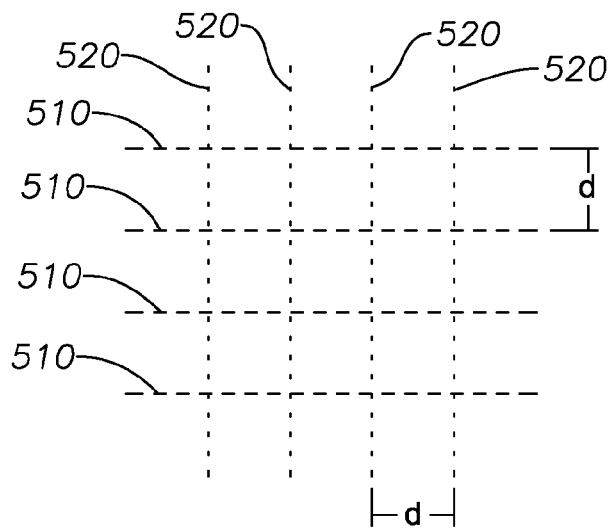
FIG. 5A-C illustrate baseline and monitor survey source and sensor arrangements in accordance with implementations of various technologies described herein.

At step 410, a baseline survey may be performed. The type of source and sensor arrangement illustrated in FIG. 5A may be used for the baseline survey. In this arrangement, linear source arrays 510 separated by a set distance (d) may be arranged substantially perpendicular to a linear sensor arrays 520 separated by the same set distance (d).

Figure 5B:
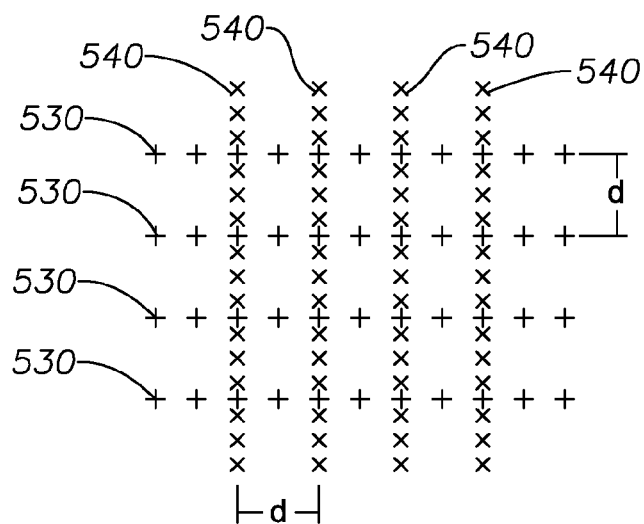
Figure 5C:
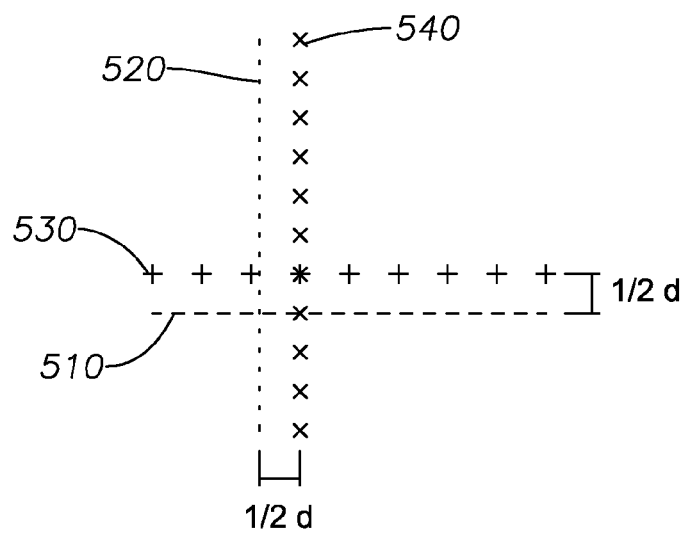

At step 415, a monitor survey may be performed with substantially the same source and sensor arrangement that may be shifted from the baseline survey source and sensor locations. FIG. 5B illustrates substantially the same arrangement of linear source arrays 530 and linear sensor arrays 540 that may have the same distance (d) between arrays as the baseline survey arrangement in FIG. 5A, but may have been shifted by approximately ½ the distance (d) between the source and sensor arrays. FIG. 5C illustrates the shift between surveys by showing one cross spread from each survey. The baseline survey linear source array 510 may be separated from the monitor survey linear source array 530 by approximately ½ d. The baseline survey linear sensor array 520 may be separated from the monitor survey linear sensor array 540 by approximately ½ d. Thus, the monitor survey may have been shifted approximately ½ d up and approximately ½ d to the right. Although the monitor survey is described as being shifted by ½ d, it should be understood that in some implementations, the monitor survey may be shifted by another distance, such as ¼ d, 1½ d and the like. Further, although the monitor survey linear source array and the monitor survey linear sensor array are described has being shifted by the same distance, e.g., ½ d, it should be understood that in some implementations, the monitor survey linear source array and the monitor survey linear sensor array may be shifted by different distances.

Figure 6A:
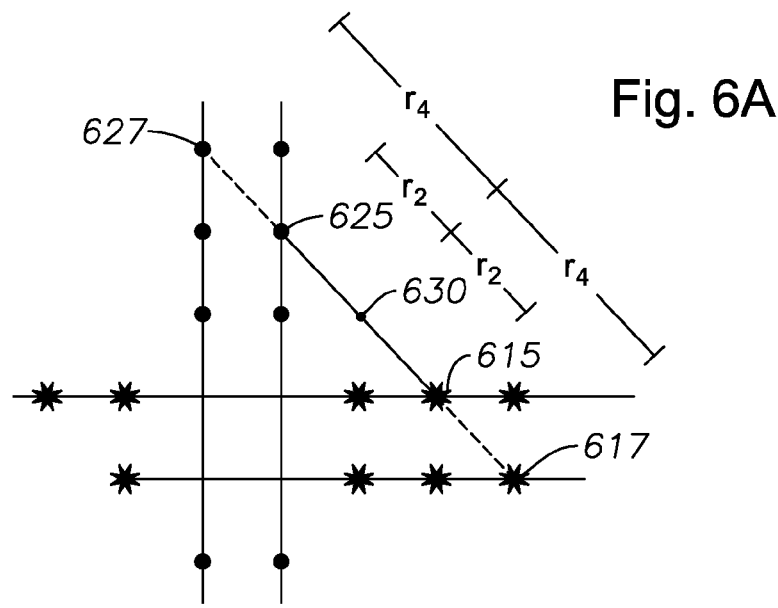
FIG. 6A-D illustrate baseline and monitor survey CMP gathers in accordance with implementations of various technologies described herein.
Figure 6B:
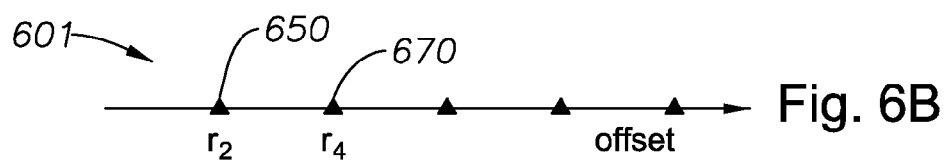

At step 420, the baseline survey may be sorted into CMP gathers. FIG. 6A illustrates two cross spreads from the baseline survey, each with a source-sensor pair generating a trace for a CMP 630. A first source 615 and sensor 625 pair may be offset from the CMP 630 by a distance ($r_2$). A second source 617 and sensor 627 pair may be offset from the CMP by a distance ($r_4$). The traces generated from each source-sensor pair with a CMP 630 may be sorted into a baseline survey CMP gather. FIG. 6B illustrates a baseline survey CMP gather 601 with traces 650 and 670 with CMP offset coordinates ($r_2$) and ($r_4$). Thus, all the traces whose source and sensor are separated from the CMP by r2 may be represented by traces 650 and all the traces whose source and sensor are separated from the CMP by r4 may be represented by traces 670. The baseline survey may be sorted into many such CMP gathers.

Figure 6C:
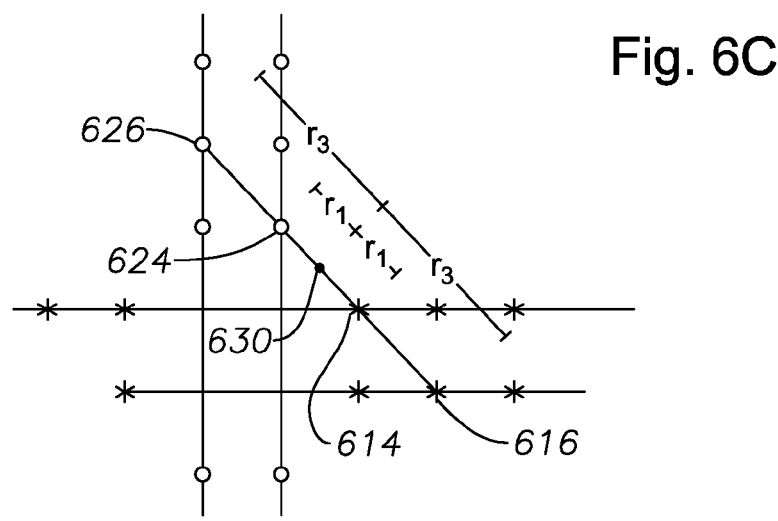
Figure 6D:
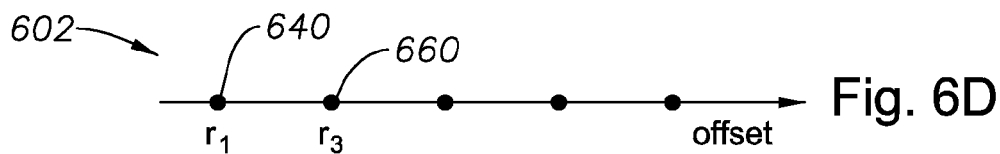

At step 425, the monitor survey may be sorted into CMP gathers. The monitor survey traces may be sorted into CMP gathers using the same CMPs as the baseline survey traces, however the offset distances (r) of each trace may be different. FIG. 6C illustrates two cross spreads from the monitor survey, each with a source-sensor pair generating a trace for a CMP 630. A first source 614 and sensor 624 pair may be offset from the CMP 630 by a distance ($r_1$). A second source 616 and sensor 626 pair may be offset from the CMP by a distance ($r_3$). The traces generated from each source-sensor pair with a CMP 630 may be sorted into a monitor survey CMP gather. FIG. 6D illustrates a monitor survey CMP gather 602 with traces 640 and 660 with CMP offset coordinates ($r_1$) and ($r_3$). The monitor survey may be sorted into many such CMP gathers.

In a time lapse survey that has been acquired by the implementations of the various technologies described herein, the monitor survey may not only enhance the fold of the baseline survey, but also provide a difference signal. In order to derive a time lapse difference image, each monitor trace may be subtracted from a baseline trace at the same CMP offset coordinates. However with a shifted monitor survey, the monitor trace coordinates may not correspond to the baseline trace coordinates. Therefore, estimated traces may be calculated in both surveys such that each baseline survey trace has a corresponding estimated monitor survey trace and each monitor survey trace has a corresponding estimated baseline survey trace. At step 430, estimated traces in each baseline CMP gather may be calculated at the monitor survey CMP offset coordinates ($r_1$) and ($r_3$). The estimation may be performed using various 1-D data regularization and interpolation techniques. For example, a normal moveout correction may be applied to the baseline CMP gather to ensure that the data is not aliased. Then, 1-D Fourier regularization may be applied to reconstruct the data on a common finely spaced regular offset grid. Finally, 1-D synchronous interpolation may be used to reconstruct baseline survey data at the monitor survey CMP offset coordinates ($r_1$) and ($r_3$). FIG. 7A illustrates a baseline CMP gather 701 with acquired traces $750_a$ and $770_a$ at coordinates ($r_2$) and ($r_4$) and estimated traces $740_e$ and $760_e$ at coordinates ($r_1$) and ($r_3$).

At step 435, estimated traces in each monitor CMP gather may be calculated at the baseline survey CMP offset coordinates ($r_2$) and ($r_4$). The estimation may be accomplished as described above in step 430. In some implementations, the baseline and monitor estimations may be calculated by identical methods; however, in other implementations the baseline and monitor estimations may be calculated differently. FIG. 7B illustrates a monitor CMP gather 702 with acquired traces $740_a$ and $760_a$ at coordinates ($r_1$) and ($r_3$) and estimated traces $750_e$ and $770_e$ at coordinates ($r_2$) and ($r_4$).

Each trace, acquired and estimated, in each baseline survey CMP gather may now have a corresponding trace at the same CMP offset coordinates in each monitor survey CMP gather. At step 440, trace differences may be calculated at each of the offset coordinates in each CMP gather by subtracting each monitor trace from the corresponding baseline trace. FIG. 8 illustrates a difference CMP gather calculated in accordance with implementations of various technologies described herein. FIG. 8 illustrates the trace differences 840, 850, 860 and 870 at each of the coordinates ($r_1$), ($r_2$), ($r_3$) and ($r_4$) in one difference CMP gather 803. A difference CMP gather may be calculated for every pair of baseline and monitor survey CMP gathers. At step 450, the trace differences may be processed to create a time-lapse difference image.

Figure 9A:
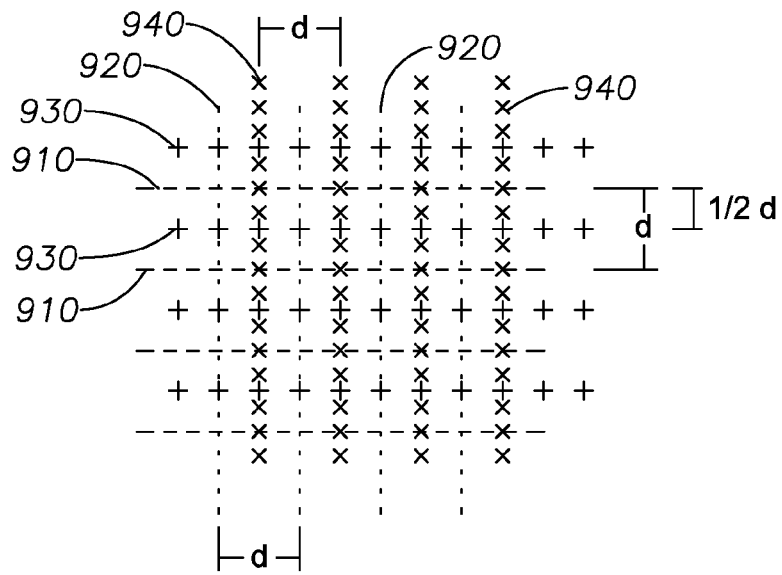
FIG. 9A-C illustrate an interleaved baseline and monitor survey CMP gather in accordance with implementations of various technologies described herein.

Referring back to step 425, in one implementation, the acquired baseline survey and acquired monitor survey CMP gathers may be interleaved to generate combined CMP gathers with twice the traces or fold of the individual surveys. FIG. 9A illustrates the combined grid coverage of the two surveys. Each baseline linear source array 910 may be a distance (d) from the adjacent baseline linear source arrays 910 and a distance (½ d) from the adjacent monitor linear source arrays 930. Likewise, each baseline linear sensor array 920 may be a distance (d) from the adjacent baseline linear sensor arrays 920 and a distance (½ d) from the adjacent monitor linear sensor arrays 940.

Figure 9B:
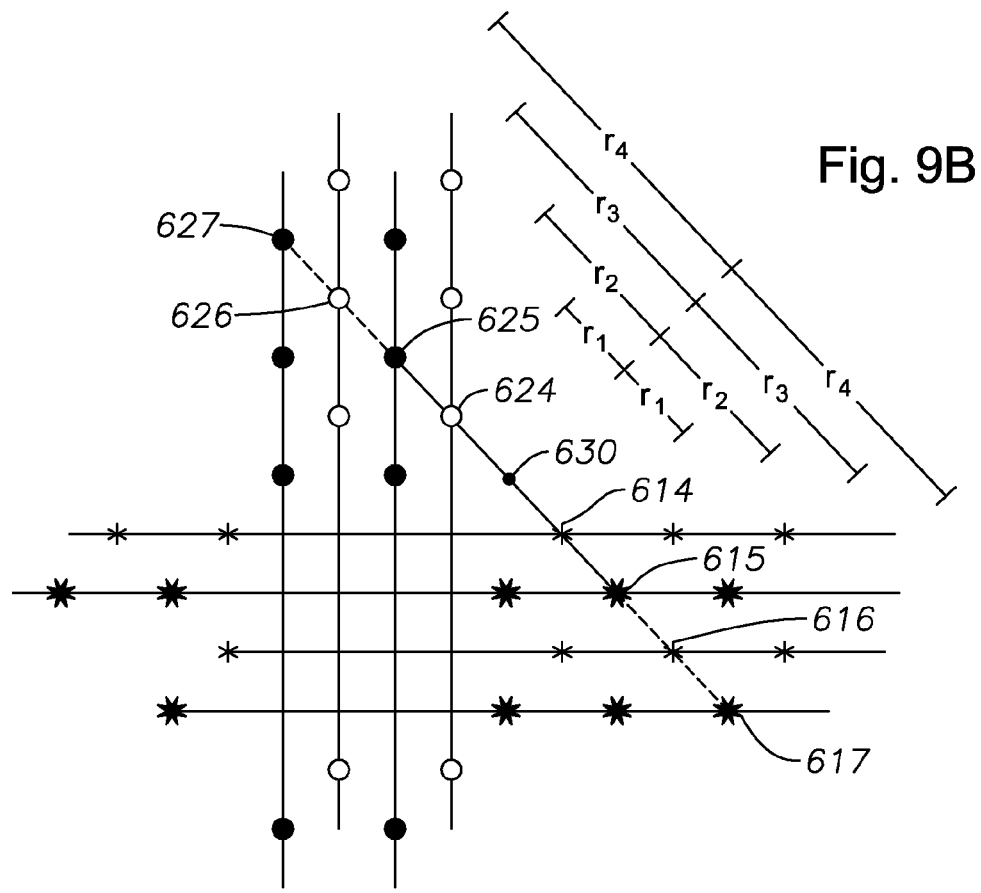
Figure 9C:
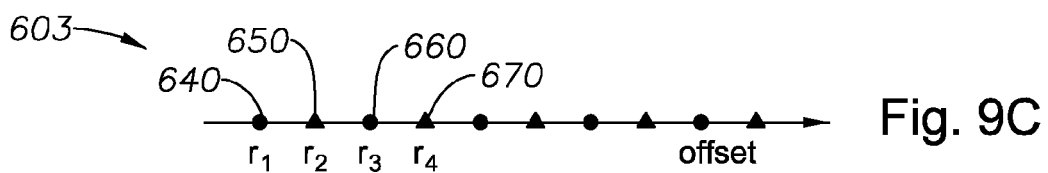

FIG. 9B illustrates two cross spreads from the baseline survey interleaved with two cross spreads from the monitor survey. Each cross spread may have a source-sensor pair generating a trace for the CMP 630. The first source 614 and sensor 624 pair from the monitor survey may be offset from the CMP 630 by a distance ($r_1$). The second source 615 and sensor 625 pair from the baseline survey may be offset from the CMP 630 by a distance ($r_2$). The third source 616 and sensor 626 pair from the monitor survey may be offset from the CMP 630 by a distance ($r_3$). The fourth source 617 and sensor 627 pair from the baseline survey may be offset from the CMP 630 by a distance ($r_4$). The traces generated from each of these source-sensor pairs may be sorted into a combined CMP gather with source-sensor pair traces with CMP 630. FIG. 9C illustrates a combined survey CMP gather 603.

The traces 650 and 670 with CMP offset coordinates ($r_2$) and ($r_4$) may be from the baseline survey, while the traces 640 and 660 with CMP offset coordinates ($r_1$) and ($r_3$) may be from the monitor survey. Interleaving the baseline and monitor surveys may result in many such combined CMP gathers.

It should be understood that the process of interleaving surveys may be repeated to further improve the image quality and/or investigate further reservoir changes. Each subsequent survey may have a source and sensor grid of the same geometry and spacing as the survey with which it will be interleaved. For example, an initial survey may be a sparse, low density 800 m×800 m survey. A second survey may be performed with the same 800 m×800 m source and sensor geometry and spacing that may be shifted ½ d which is half the distance (d) between cross spreads. The initial and second surveys may be interleaved to produce a combined 400 m×400 m survey. A third survey may then be performed with the 400 m×400 m source and sensor geometry and spacing that may have been shifted ¼ d which is half the distance (½ d) between cross spreads. The combined 400 m×400 m survey and the third survey may be interleaved to create a 200 m×200 m survey and so on. Thus, this method of interleaving time lapse surveys may be used not only to derive difference images, but also to progressively improve the resolution of geological data. The fold may be increased and the signal to noise ratio may be improved. Additionally, this method may reduce total project costs because each survey adds new seismic data and previous survey data may be reused.

It should be understood that while a square grid layout is depicted, other source sensor layouts that are well known in the art, such as angled, brick or the like, may be used. It should also be understood that while land seismic acquisition is described, the implementations of various technologies described herein may be applied in any type of seismic acquisition, such as marine seismic acquisition.

Figure 10:
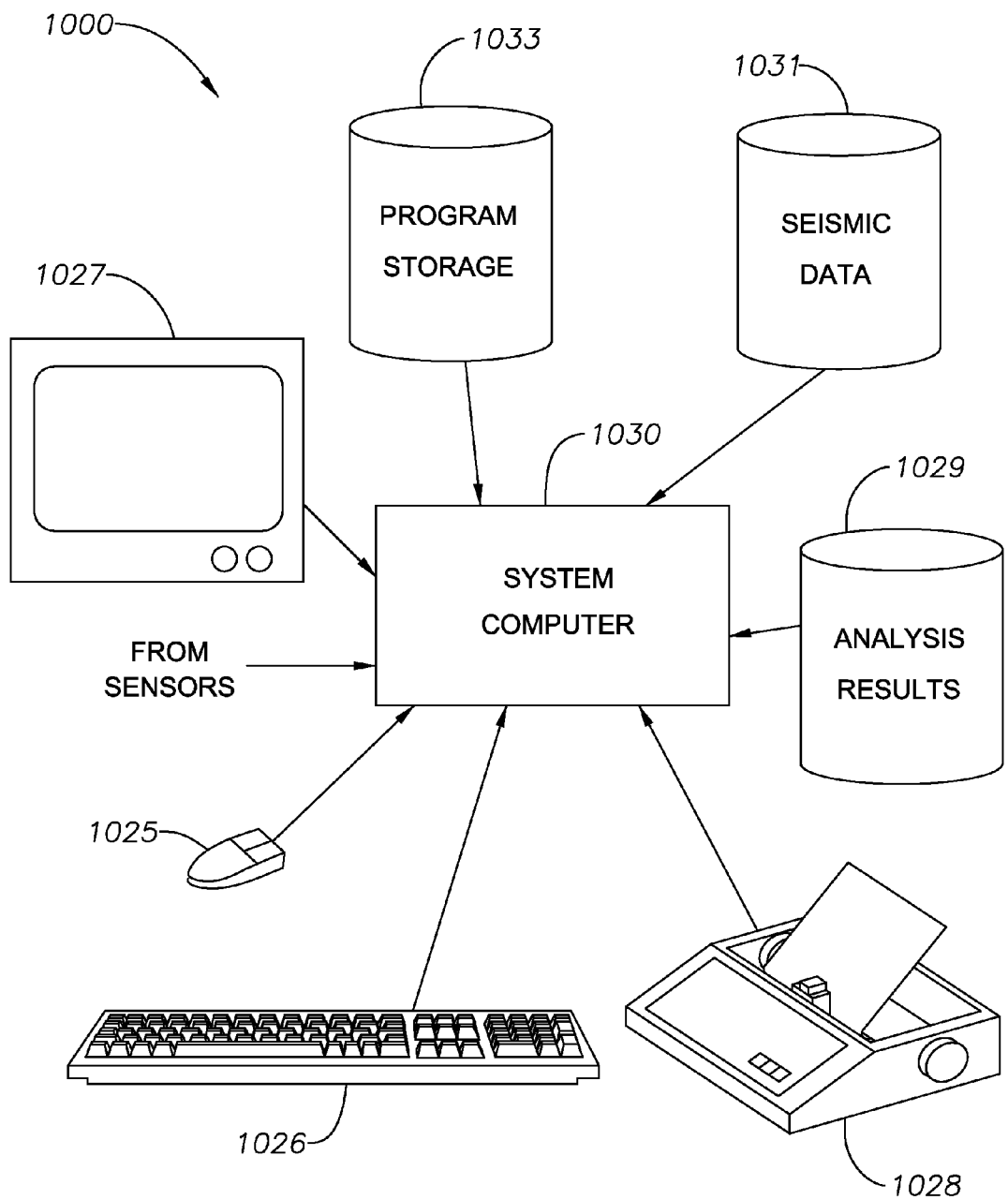
FIG. 10 illustrates a computer network, into which implementations of various technologies described herein may be implemented.

FIG. 10 illustrates a computer network 1000, into which implementations of various technologies described herein may be implemented. The computer network 1000 may include a system computer 1030, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 1030 may be in communication with disk storage devices 1029, 1031, and 1033, which may be external hard disk storage devices. It is contemplated that disk storage devices 1029, 1031, and 1033 are conventional hard disk drives, and as such, will be implemented by way of a local area network or by remote access. Of course, while disk storage devices 1029, 1031, and 1033 are illustrated as separate devices, a single disk storage device may be used to store any and all of the program instructions, measurement data, and results as desired.

In one implementation, seismic data from the sensors may be stored in disk storage device 1031. The system computer 1030 may retrieve the appropriate data from the disk storage device 1031 to process seismic data according to program instructions that correspond to implementations of various technologies described herein. The program instructions may be written in a computer programming language, such as C++, Java and the like. The program instructions may be stored in a computer-readable medium, such as program disk storage device 1033. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1030 may present output primarily onto graphics display 1027, or alternatively via printer 1028. The system computer 1030 may store the results of the methods described above on disk storage 1029, for later use and further analysis. The keyboard 1026 and the pointing device (e.g., a mouse, trackball, or the like) 1025 may be provided with the system computer 1030 to enable interactive operation.

The system computer 1030 may be located at a data center remote from the survey region. The system computer 1030 may be in communication with the sensors (either directly or via a recording unit, not shown), to receive signals indicative of the reflected seismic energy. These signals, after conventional formatting and other initial processing, may be stored by the system computer 1030 as digital data in the disk storage 1031 for subsequent retrieval and processing in the manner described above. While FIG. 10 illustrates the disk storage 1031 as directly connected to the system computer 1030, it is also contemplated that the disk storage device 1031 may be accessible through a local area network or by remote access. Furthermore, while disk storage devices 1029, 1031 are illustrated as separate devices for storing input seismic data and analysis results, the disk storage devices 1029, 1031 may be implemented within a single disk drive (either together with or separately from program disk storage device 1033), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a time lapse difference image, comprising:
   sorting a first seismic data set acquired using a first seismic survey into one or more common mid-point (CMP) gathers based on one or more CMPs; and
   sorting a second seismic data set acquired using a second seismic survey into one or more CMP gathers based on the CMPs;
   estimating a trace in each CMP gather of the first seismic survey at each CMP offset coordinate of the second seismic survey;
   estimating a trace in each CMP gather of the second seismic survey at each CMP offset coordinate of the first seismic survey; and
   calculating trace differences, using a processor, between the first seismic survey CMP gathers and the second seismic survey CMP gathers at each CMP offset coordinate of the first seismic survey and the second seismic survey.

2. The method of claim 1, further comprising:
   performing a first seismic survey using a plurality of first source arrays and a plurality of first sensor arrays; and
   performing a second seismic survey using a plurality of second source arrays and a plurality of second sensor arrays, wherein the second source arrays are positioned at a first predetermined distance from the first source arrays and the second sensor arrays are positioned at a second predetermined distance from the first sensor arrays.

3. The method of claim 2, wherein the first source arrays are arranged substantially perpendicular to the first sensor arrays.

4. The method of claim 2, wherein the second source arrays are arranged substantially perpendicular to the second sensor arrays.

5. The method of claim 2, wherein the source arrays are linear source arrays.

6. The method of claim 2, wherein the sensor arrays are linear sensor arrays.

7. The method of claim 2, wherein the first source arrays are separated by a distance d and the first sensor arrays are separated by the distance d.

8. The method of claim 7, wherein the first predetermined distance is half of the distance d.

9. The method of claim 7, wherein the second predetermined distance is half of the distance d.

10. The method of claim 1, wherein the estimations are performed using 1-D data regularization, interpolation techniques or both.

11. The method of claim 1, further comprising generating a time lapse difference image using the trace differences.

12. The method of claim 1, wherein each estimated trace in the first seismic survey data set corresponds to an acquired trace in the second seismic survey data set.

13. The method of claim 1, wherein each estimated trace in the second seismic survey data set corresponds to an acquired trace in the first seismic survey data set.

14. The method of claim 1, wherein calculating the trace differences comprises subtracting one of an estimated trace and an acquired trace in the second seismic survey data set from one of an acquired trace and an estimated trace in the first seismic survey data set.

15. A computer system, comprising:
   a processor; and
   a memory comprising program instructions executable by the processor to:
      sort a first seismic data set acquired using a first seismic survey into one or more common mid-point (CMP) gathers based on one or more CMPs; and
      sort a second seismic data set acquired using a second seismic survey into one or more CMP gathers based on the CMPs;
      estimate a trace in each CMP gather of the first seismic survey at each trace CMP offset coordinate of the second seismic survey;
      estimate a trace in each CMP gather of the second seismic survey at each CMP offset coordinate of the first seismic survey; and
   calculate trace differences between the first seismic survey CMP gathers and the second seismic survey CMP gathers at each CMP offset coordinate of the first seismic survey data set and the second seismic survey.

16. The computer system of claim 15, wherein the trace in at least one of the first seismic survey data set and the second seismic survey data set is estimated using 1-D data regularization and interpolation techniques.

17. The computer system of claim 15, wherein the memory further comprises program instructions executable by the processor to generate a time lapse difference image using the trace differences.

* * * * *